(12) United States Patent
Kapil et al.

(10) Patent No.: US 9,372,813 B2
(45) Date of Patent: Jun. 21, 2016

(54) REMOTE-KEY BASED MEMORY BUFFER ACCESS CONTROL MECHANISM

(71) Applicant: Oracle International Corporation, Redwood Shores, CA (US)

(72) Inventors: Sanjiv Kapil, Cupertino, CA (US); Garret F. Swart, Palo Alto, CA (US); Aings Aingaran, Santa Clara, CA (US); William H. Bridge, Jr., Alameda, CA (US); Sumti Jairath, Santa Clara, CA (US); John G. Johnson, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 558 days.

(21) Appl. No.: 13/839,525

(22) Filed: Mar. 15, 2013

(65) Prior Publication Data
US 2014/0095805 A1     Apr. 3, 2014

Related U.S. Application Data

(60) Provisional application No. 61/709,142, filed on Oct. 2, 2012.

(51) Int. Cl.
G06F 12/00     (2006.01)
G06F 13/10     (2006.01)
(Continued)

(52) U.S. Cl.
CPC ............ *G06F 13/102* (2013.01); *G06F 9/3851* (2013.01); *G06F 9/3867* (2013.01);
(Continued)

(58) Field of Classification Search
CPC .................. G06F 17/30498; G06F 17/30501; G06F 17/30595; G06F 17/30519; G06F 17/30495; G06F 17/30442; G06F 17/30578; G06F 12/1475; G06F 17/30483; G06F 21/6209; G06F 9/3851; G06F 15/7889; Y02B 60/188; H04L 69/14
See application file for complete search history.

(56) References Cited

U.S. PATENT DOCUMENTS 4,817,140 A *   3/1989   Chandra ............. G06F 12/1408
                                                                380/277
5,133,053 A    7/1992   Johnson
(Continued)

FOREIGN PATENT DOCUMENTS

EP     2 423 843 A1    2/2012
WO    WO 02/19115 A2   3/2002
WO    WO 02/078254    10/2002

OTHER PUBLICATIONS

Brewer et al., "Remote Queues: Exposing Message Queues for Optimization and Atomicity", dated 1995 ACM, 12 pages.

(Continued)

*Primary Examiner* — Larry Mackall
(74) *Attorney, Agent, or Firm* — Hickman Palermo Becker Bingham LLP (57) ABSTRACT

A system and method implementing revocable secure remote keys is disclosed. A plurality of indexed base secrets is stored in a register of a coprocessor of a local node coupled with a local memory. When it is determined that a selected base secret expired, the base secret stored in the register based on the base secret index is changed, thereby invalidating remote keys generated based on the expired base secret. A remote key with validation data and a base secret index is received from a node requesting access to the local memory. A validation base secret is obtained from the register based on the base secret index. The coprocessor performs hardware validation on the validation data based on the validation base secret. Hardware validation fails if the base secret associated with the base secret index has been changed in the register of the selected coprocessor.

32 Claims, 7 Drawing Sheets

(51) Int. Cl.
*G06F 17/30* (2006.01)
*G06F 9/54* (2006.01)
*G06F 9/38* (2006.01)
*G06F 12/08* (2016.01)
*G06F 12/12* (2016.01)
*G06F 15/173* (2006.01)
*G06F 12/14* (2006.01)
*G06F 21/62* (2013.01)
*H04L 29/06* (2006.01)
*G06F 15/78* (2006.01)
*G06F 13/362* (2006.01)
*G06F 13/40* (2006.01)

(52) U.S. Cl.
CPC ............ *G06F 9/546* (2013.01); *G06F 12/082* (2013.01); *G06F 12/0804* (2013.01); *G06F 12/12* (2013.01); *G06F 12/1408* (2013.01); *G06F 12/1475* (2013.01); *G06F 13/362* (2013.01); *G06F 13/4068* (2013.01); *G06F 15/17331* (2013.01); *G06F 15/7889* (2013.01); *G06F 17/30324* (2013.01); *G06F 17/30442* (2013.01); *G06F 17/30483* (2013.01); *G06F 17/30495* (2013.01); *G06F 17/30498* (2013.01); *G06F 17/30501* (2013.01); *G06F 17/30519* (2013.01); *G06F 17/30578* (2013.01); *G06F 17/30595* (2013.01); *G06F 17/30867* (2013.01); *G06F 21/6209* (2013.01); *H04L 69/14* (2013.01); *Y02B 60/188* (2013.01)

(56) References Cited

U.S. PATENT DOCUMENTS

| | | | |
|---|---|---|---|
| 5,581,705 | A | 12/1996 | Passint et al. |
| 6,175,566 | B1 | 1/2001 | Hahn |
| 6,757,790 | B2 | 6/2004 | Chalmer |
| 7,218,643 | B1 | 5/2007 | Saito |
| 7,725,595 | B1 | 5/2010 | Geissler et al. |
| 8,255,922 | B1 | 8/2012 | Fresko |
| 9,052,936 | B1 | 6/2015 | Aron |
| 9,083,614 | B2 | 7/2015 | Falco |
| 2002/0184392 | A1 | 12/2002 | Parthasarathy et al. |
| 2002/0191599 | A1 | 12/2002 | Parthasarathy |
| 2003/0061417 | A1 | 3/2003 | Craddock |
| 2003/0105914 | A1 | 6/2003 | Dearth |
| 2006/0095690 | A1 | 5/2006 | Craddock et al. |
| 2006/0098649 | A1* | 5/2006 | Shay ............... H04L 63/102 370/389 |
| 2009/0037571 | A1 | 2/2009 | Bozak |
| 2012/0011398 | A1 | 1/2012 | Eckhardt |
| 2013/0013843 | A1 | 1/2013 | Radovic et al. |
| 2013/0036332 | A1 | 2/2013 | Gove et al. |
| 2014/0095651 | A1 | 4/2014 | Kapil et al. |
| 2014/0096145 | A1 | 4/2014 | Aingaran et al. |
| 2014/0181454 | A1 | 6/2014 | Manula |
| 2014/0229440 | A1 | 8/2014 | Venkatesh |
| 2015/0278103 | A1 | 10/2015 | Radovic et al. |

OTHER PUBLICATIONS

Von Eicken et al., "Active Messages: A Mechanism for Integrated Communication and Computation", dated 1992, ACM, 12 pages.
Ming et al., "An Efficient Attribute Based Encryption Scheme with Revocation for Outsourced Data Sharing Control", dated 2011, 6 pages.
Wang et al., "HyperSafe: A Lightweight Approach to Provide Lifetime hypervisor Control-Flow Integrity" IEEE, dated 2010, 16 pages.
Yu et al., "Attribute Based Data Sharing with Attribute Revocation" dated Apr. 13-16, 2010, ASIACCS, 10 pages.
Wang et al., "Hierarchical Attribute-based Encryption and Scalable User Revocation for Sharing Data in Cloud Servers", 2011, 12 pages.
Zhang, Long, "Attribute Based Encryption Made Practical", dated Apr. 2012, 62 pages.
Zhang, Long, "Attribute Based Encryption Made Practical", From the Internet http://hdl.handle.net/2429/42138, dated Apr. 1, 2012, 62 pages.
Franke et al., "Introduction to the wire-speed processor and architecture" IBM J. Res & Dev. vol. 54 No. 1 Paper 3, dated Jan. 2010, 12 pages.
Gao et al., "Application-Transparent Checkpoint/Restart for MPI Programs over InfiniBand", dated 2006, 8 pages.
Lee et al., "A Comprehensive Framework for Enhancing Security in InfiniBand Architecture", IEEE, vol. 18 No. 10, Oct. 2007, 14 pages.
U.S. Appl. No. 13/838,542, filed Mar. 15, 2013, Office Action, mailed Oct. 13, 2015.

* cited by examiner

REMOTE-KEY BASED MEMORY BUFFER ACCESS CONTROL MECHANISM

CROSS-REFERENCE TO RELATED APPLICATIONS; BENEFIT CLAIM

This application claims the benefit of Provisional App. No. 61/709,142, filed Oct. 2, 2012, the entire contents of which is hereby incorporated by reference as if fully set forth herein, under 35 U.S.C. §119(e). U.S. application Ser. No. 13/778,307, filed Feb. 27, 2013, and U.S. application Ser. No. 13/838,542 to Sanjiv Kapil, et al., titled "MEMORY BUS PROTOCOL TO ENABLE CLUSTERING BETWEEN NODES OF DISTINCT PHYSICAL DOMAIN ADDRESS SPACES," filed Mar. 15, 2013, are hereby incorporated by reference in their entirety as if fully set forth herein.

FIELD OF THE INVENTION

The present invention relates generally to hardware computing devices. More specifically, the present invention relates to remote-key based memory buffer access control mechanisms.

BACKGROUND

Individual processor speed continues to increase with new technology. Greater performance is also attainable by using clusters of nodes with multiple processors. For example, database systems often distribute portions of a database across several nodes in a cluster in order to improve performance and provide scalability. The use of multiple nodes requires methods for sharing data between nodes. Clusters may be configured as coherent memory clusters or compute clusters.

Nodes on a coherent memory cluster share physical memory. Sharing physical memory allows each node on the cluster to communicate very quickly. To send and receive messages between two nodes on a shared memory cluster, one node will write data to the shared memory and the other node will read the data from the shared memory. However, coherent memory clusters are expensive and the size of the shared memory is limited.

Nodes on a compute cluster do not share physical memory. Communication between nodes on a compute cluster may be performed through messaging. Furthermore, compute nodes may need to reassemble incoming messages and store the reassembled messages in a node's main memory. Typically, nodes on a compute cluster communicate over a common bus, such as to access memory local to another node. One drawback of a shared bus architecture is that the common bus becomes a performance-limiting element as internode communications queue up and compete for the use of the common bus. Once the common bus is saturated or nearly saturated, very little improvement in performance is achieved by adding additional nodes.

One technique to overcome the disadvantages of a shared bus architecture involves dedicated high-speed point-to-point communications links between node pairs. However, a complex, layered communications protocol is required to guarantee accurate, robust communication. At each node on a communication path, an interface processor must carry out this complex protocol as well as translate and validate the source and destination addresses. Performing these communications tasks lowers performance because the interface processors are generally much slower than the main CPU, and further because the coupling between the interface and the respective node's memory is poor. Thus, performance is also limited using a shared bus architecture.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method implementing revocable secure remote keys is disclosed. A plurality of indexed base secrets is stored in a register of a coprocessor of a local node coupled with a local memory. As used herein, the term "base secret" refers to any data usable as a key. When it is determined that a selected base secret should be invalidated, the base secret is changed in the register, thereby invalidating remote keys generated based on the expired base secret.

When a remote node requests access to the local memory of a local node, it includes a remote key comprising validation data and a base secret index. A coprocessor of the local node obtains a validation base secret from the register based using the base secret index. The coprocessor performs hardware validation on the validation data in the remote key based on the validation base secret, e.g. without using any software instructions or programming API assists to perform the validation. Hardware validation fails if the base secret associated with the base secret index has been changed in the register of the selected coprocessor. After a key expires, rights granted to the physical memory location associated with the remote key are revoked, and access requires a new key.

The revocable keys allow for revocable memory access capability with transaction level security. The physical memory address space is not exposed outside of the local physical domain. This type of access is useful for messaging and data sharing between nodes. The coprocessors are configured to perform hardware validation of the remote key and hardware execution of data-related commands, improving message throughput related to inter-process communication and memory data accesses between nodes.

Figure 1:
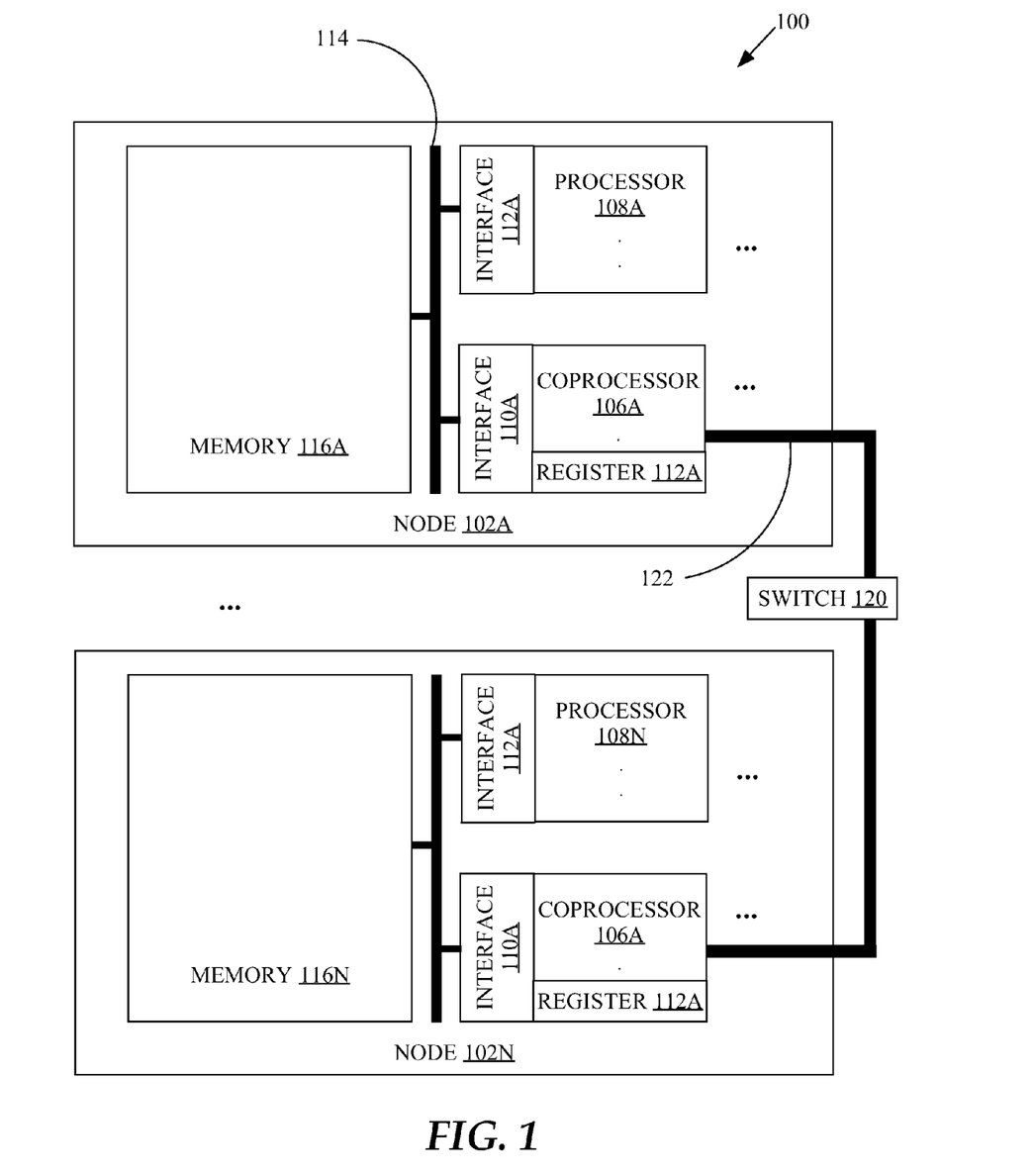
FIG. 1 is a block diagram that illustrates nodes of a system compatible with an embodiment the remote-key based memory buffer access control mechanism described herein.

FIG. 1 is a block diagram that illustrates nodes of a system compatible with an embodiment the remote-key based memory buffer access control mechanism described herein. Distributed shared memory system 100 includes a plurality of nodes 102A-102N. Nodes 102A-102N reside in two or more physical domains. In one embodiment, each physical domain corresponds to one of nodes 102A-102N. A node may have one or more processing sockets, each processing socket including at least one coprocessor 106A-106N. In one embodiment, at least one node 102A-102N may have additional processing sockets. Nodes 102A-102N each have a memory 116A-116N that is local to each node 102A-102N.

As used herein, the term "memory" may refer to any computer storage medium associated with a persistent address space, a non-persistent address space, or any combination thereof, including but not limited to volatile memory, non-volatile memory, floppy disks, magnetic storage media, optical storage media, RAM, PROM, EPROM, FLASH-EPROM, any other memory chip or cartridge, or any other medium from which a computer can read. When local memory 116A-116N refers to a persistent address space, nodes 102A-102N are storage nodes. When local memory 116A-116N refers to a non-persistent address space, nodes 102A-102N are compute nodes.

Each node 102A-102N also includes at least one primary processor 108A-108N and at least one coprocessor 106A-106N. The primary processor 108A-108N and coprocessor 106A-106N of each node 102A-102N are configured to access local memory 116A-116N local to the physical domain. For example, each processor 108A-108N may include a memory interface 112A-112N to respective physical memory 116A-116N, and each coprocessor 106A-106N may include a memory interface 110A-110N to respective physical memory 116A-116N. The memory interfaces 110A-112N may access the respective local memory 116A-116N via BUS 114.

Coprocessors 106A-106N include digital circuits that are either hardwired to perform a set of functions or persistently programmed to perform the set of functions. The functions are performed independently of a general purpose processor configured to perform functions by executing a software instruction set or program, such as primary processors 108A-108N. As used herein, the term "coprocessor" refers to a distinct processing entity, but not necessarily a distinct physical device separate from CPU or other processor. For example, the coprocessor can be a core of a CPU. In one embodiment, when the coprocessor is a core of a CPU, the ability of a node 102A-102N to handle data storage and/or maintenance commands automatically scales with the number of CPUs the node 102A-102N has.

Coprocessors 106A-106N may, but are in no way limited to, send commands, receive commands, authenticate commands, enqueue entries, synchronize messages, reassemble incoming messages, and report errors, without software intervention. In one embodiment, coprocessors 106A-106N of distributed shared memory system 100 are configured to accept commands and addresses specified in a command block. In command block, either a remote key or a physical address location may be provided as an address. The remote key may be used when the address refers to an address outside of a local physical domain.

Coprocessors 106A-106N are configured to move data, send messages between clients (e.g. processes, kernels, and hypervisors) and may be configured to perform one or more other operations without using any software instructions or programming API assists. In one embodiment, coprocessors 106A-106N are configured to perform a set of support data movement and maintenance commands without support from primary processors 108A-108N. Coprocessors 106A-106N may also be configured in hardware to validate a remote key, such as a remote key received in a request to execute one or more commands in an associated memory 116A-116N.

Coprocessors 106A-106N may be coupled with respective registers 112A-112N. Registers 112A-112N may store base secret data for generating and validating remote keys. Remote keys are certificates granted by the owner of a block of physical memory to a remote user. In one embodiment, remote keys are necessary for a remote node to access a remote memory 116A-116N outside of the physical domain to which it belongs. For example, a remote key may be required to access memory 116A-116N outside of a selected node. The remote key includes validation data generated using a selected base secret and an index to the base secret in the registry. The remote key is authenticated by using the index to obtain a base secret from the registry. As long as the base secret has not been changed in the registry, the remote key issued using the base secret may be validated by the coprocessor.

In one embodiment, interfaces 110A-110N of coprocessors 106A-106N are further configured to interact with a software hypervisor associated with the respective node 102A-102N. In one embodiment, the hypervisor is a special multi-threaded driver that provides an API interface between the operating system and/or other software code and coprocessors 106A-106N. The hypervisor issues commands to coprocessors 106A-106N over the hypervisor interface.

The hypervisor may be configured to configure coprocessors 106A-106N, such as to synchronize the set of base secrets stored in registers 112A-112N of coprocessors 106A-106N. In one embodiment, the hypervisor is configured to determine when a base secret has expired and change the expired base secret associated with a specific base secret index in all the registers of the coprocessors in the local physical domain. For example, the hypervisor may be configured to change an expired base secret associated with a specific base secret index in all the registers of the coprocessors of one node. After a base secret is changed, remote keys generated based on the base secret are invalidated.

Coprocessors 106A-106N may be communicatively coupled to interface with both local and non-local memory to socket, local/non-local last level caches and to remote physical domains, including remote nodes, using interconnect 122 and external switch 120. In one embodiment, coprocessors 106A-106N include hardware comprising messaging infrastructure and do not require external assistance other than external switch 120 to facilitate message routing between physical domains. All coprocessor memory operations are cache coherent within same a local physical domain. A remote key only needs to be authenticated by the destination node that contains the block of physical memory associated with the remote key. A request associated with the remote key does not need to be translated or validated by any intermediate node. This allows for remote key management to remain local to each node, eliminating the need and overhead of synchronization of key validity information across remote domains. This local remote key management system allows for better scalability, such as increasing the number of nodes in a system.

Remote Key Structure

Figure 2:
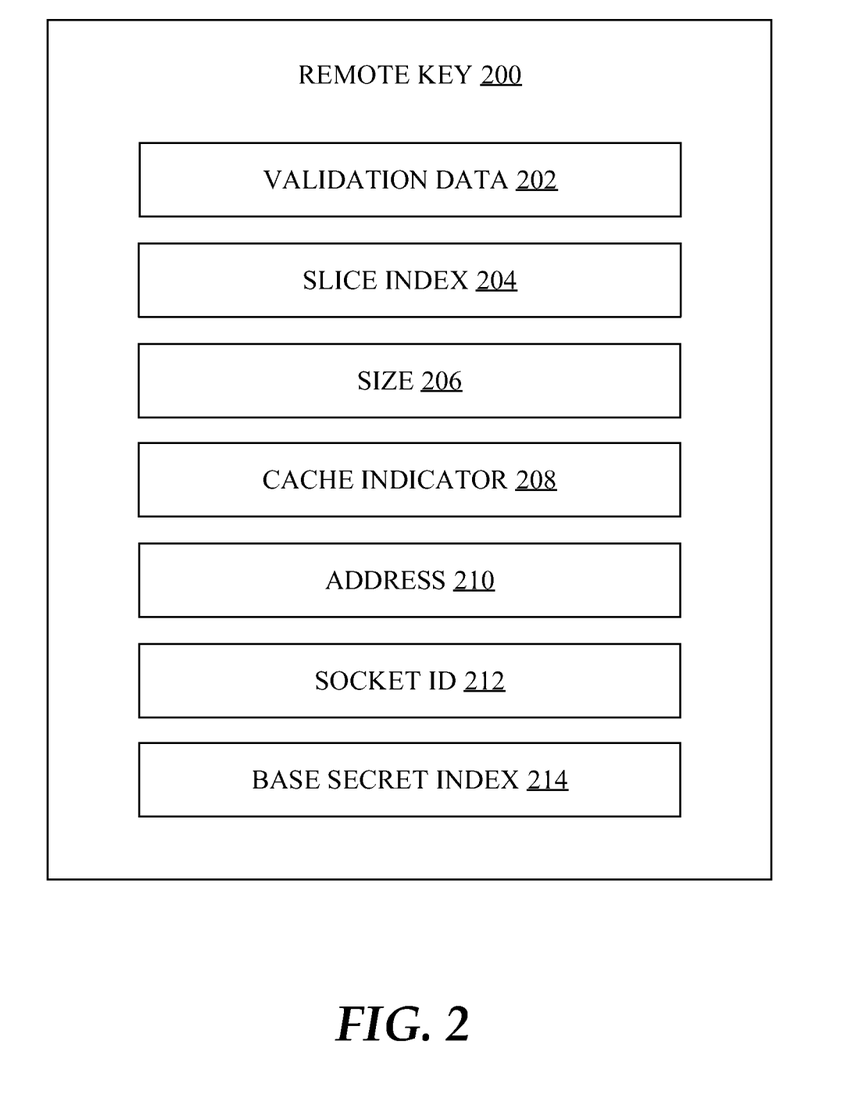
FIG. 2 is a block diagram of an embodiment of a remote key in accordance with the remote-key based memory buffer access control mechanism described herein.

FIG. 2 is a block diagram of an embodiment of a remote key in accordance with the remote-key based memory buffer access control mechanism described herein. Remote keys are certificates granted by the owner of a block of physical memory to a remote client associated with a remote node. A remote client presents the remote key, which is validated in the local node before a request to access to the local physical address is serviced. For example, the remote key may be transmitted with a data storage or maintenance command to a node associated with the block of physical memory.

Remote key 200 includes validation data 202. Validation data 202 is a signature of the local node. Validation data 202 is generated using a based secret known to the local node. Knowledge of the base secret used to generate remote key 200 is necessary to validate remote key 200. Therefore, only a coprocessor of the local node can validate remote key 200.

In one embodiment, a set of base secrets are stored in the registry of one or more local coprocessors residing on the local node that contains the block of physical memory associated with remote key 200. The remote key further includes a base secret index 214 identifying a base secret location associated with the base secret used to generate the validation data. For example, base secret index 214 may identify an array index of an array of base secrets stored in a registry of the local coprocessor.

In one embodiment, remote key 200 includes slice index 204. Slice index 204 identifies a slice of a sliced base secret. A slice may be individually used to invalidate remote keys associated with the slice without invalidating all remote keys associated with the sliceable remote key. Both sliced base secrets and unsliced base secrets may be used in the same implementation. The slice validation data may be stored in hardware, such as in coprocessor registers associated with local node.

Sliced base secrets may be used to lower the frequency of remote key invalidation required. By slicing at least a portion of the base secrets, less base secrets may be used, reducing the size of one or more remote key fields, such as slice index 204. In one embodiment, both sliced base secrets and unsliced base secrets are used. The type of base secret used to generate a specific remote key may be selected to minimize the effect of invalidation. When a remote key is invalidated by changing a base secret, every remote key generated based on that base secret is also invalidated. A single sliced base secret is split into slices, each of which may be invalidated independently of other slices associated with that base secret.

In one embodiment, 2^m sliced base secrets are used, and each sliced base secret is sliced into 2^n slices. The slice index may contain information identifying both the base secret and the slice. For example, the slice index may be m+n bits, where m bits are used to represent the base secret index and n bits are used to represent the slice. Although each sliced base secret is sliced into the same number of slices in this example, sliced base secrets may be sliced into different numbers of slices.

Validation data may comprise a hash field generated using a hashing and/or encryption algorithm, where a selected base secret is used as a key. The algorithm may be applied to data that includes slice index 204, size 206, cache indicator 208, address 210, socket ID 212, and/or any other data. When the base secret associated with base secret index 214 is used to generate remote key 200, remote key 200 is valid as long as the base secret stored in association with the base secret index 214 remains unchanged in the registers of the coprocessors of the local node.

In the non-limiting example below, validation data 202 is obtained by applying a Data Encryption Standard (DES) algorithm to a bit array comprising slice index 204 (if the key is sliceable), socket ID 212, address 210, size 206 and cache indicator 208. A locally stored base secret associated with the base secret index 214 is used as a key.

In this non-limiting example, the validation data includes a hash signature generated using key Basesecret[SecretNum]. When a coprocessor validates a remote key containing the hash signature, the coprocessor will decrypt the hash signature based on a locally stored base secret stored in association with base secret index SecretNum. The decrypted information will be compared with other information of the remote key, such as slice index 204, socket ID 212, address 210, size 205 and cache indicator 208. This validation will fail if the base secret stored in association with base secret index SecretNum has been changed on the local node.

Remote key 200 further includes Socket ID 212. Socket ID 212 identifies the node that contains the block of physical memory associated with remote key 200. Remote key 200 further includes address 210. Address 210 identifies the physical address of the block of physical memory associated with remote key 200. Remote key 200 further includes size 206. Size 206 indicates the size of block of physical memory associated with remote key 200. In one embodiment, a fixed bit field of remote key 200 is dedicated to encoding size 206, where the total range and the granularity depend on the size of the bit field. For example, size 206 may be in a range of from about 1 KB to about 1 TB.

In one embodiment, remote key 200 includes cache indicator 208. Cache indicator 208 indicates whether a command transmitted with remote key 200 should be cached in hardware, such as any cache of a destination node associated with socket ID 212. The command may be a data storage or maintenance command that is executed with respect to data associated with the command, including data received from the remote node. The associated data may also be cached. The cache may be a higher level cache and/or a last level cache, such as a L3 cache, although any cache associated with the destination node may be used. As a non-limiting example, the command may involve a write command to write at least a portion of the associated data into the physical memory of the local node, and cache indicator 208 allows the write data to be modified in the last level cache. As another non-limiting example, the command may involve reading a buffer from the local physical memory, and cache indicator 208 allows the local node to read dirty and/or clean lines from the cache in response to commands from the remote node. A coprocessor handling remote key 200 and an associated command may be configured to selectively cache the command based on the cache indicator. The coprocessor may make a local decision to override cache indicator 208 in remote key 200.

Remote key 200 may be configured to have a set where each field 202-214 of remote key 200 has a known position within remote key 200. The coprocessors of a distributed shared memory system may be configured to accept and read commands and addresses specified in a command block based on the known configuration of remote key 200 and its associated fields.

Register Data

Figure 3:
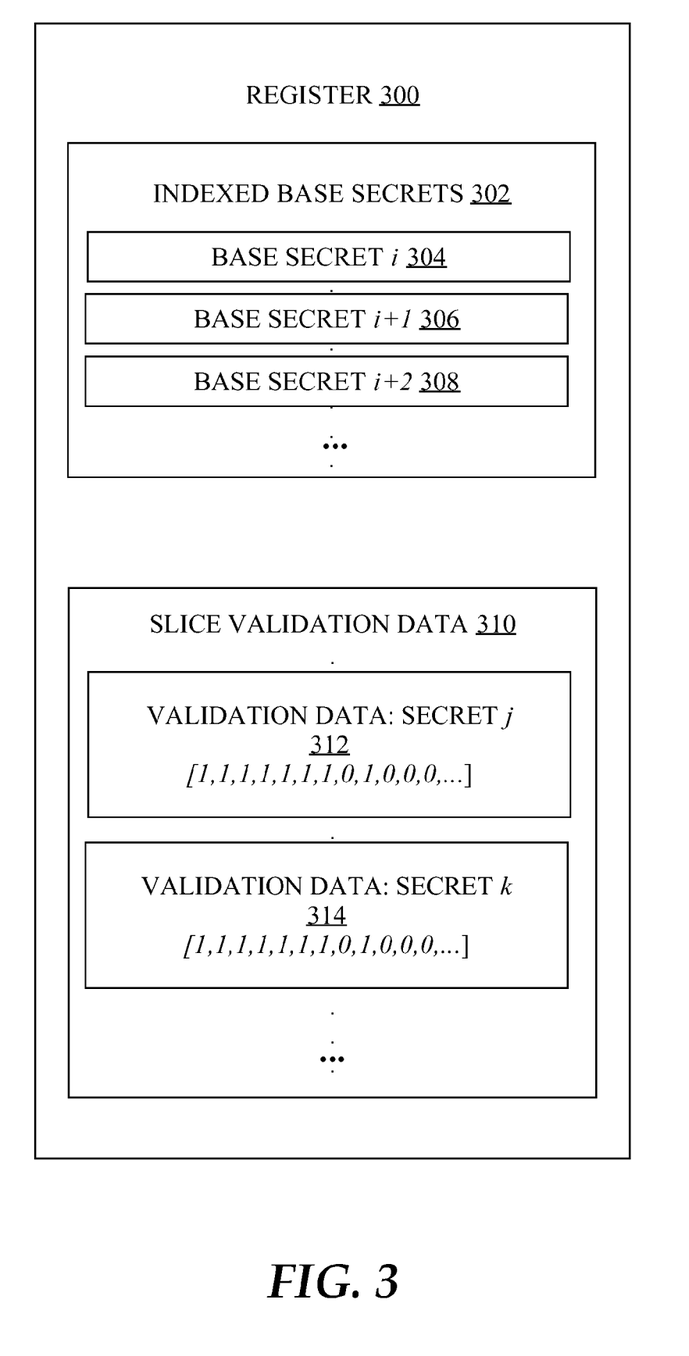
FIG. 3 is a block diagram of an embodiment of registry data in accordance with the remote-key based memory buffer access control mechanism described herein.

FIG. 3 is a block diagram of an embodiment of register data in accordance with the remote-key based memory buffer access control mechanism described herein. Register 300 may store encoded data for generating and validating remote keys in hardware, e.g. without using any software instructions or programming API assists to generate and/or validate a remote key.

In one embodiment, register 300 includes a set of indexed base secrets 302. Base secrets 304-308 are used to generate a remote key issued to a remote node. The remote key includes validation data generated using a selected base secret and an index to the base secret in the registry. When the remote key is used to access the associated physical memory address, a coprocessor local to the memory authenticates the remote key by using the index to obtain a base secret 304-308 from registry 300. As long as the base secret has not been changed in registry 300, the remote key issued using the base secret may be validated by the coprocessor. In one embodiment, indexed base secrets 302 is stored in a fixed array in register 300, where i=0.

In one embodiment, all registers 300 of coprocessors of a node contain the same indexed base secrets 302. Software instructions executing on one or more local primary processors may cause the one or more local primary processors to determine that a selected base secret is expired and change the selected base secret in one or more local register 300 based on a selected base secret index associated with the selected base secret. Changing the selected base secret invalidates remote keys generated based on the selected base secret before the selected base secret is changed in register 300. In one embodiment, the software instructions are part of a software hypervisor.

Register 300 may further store slice validation data 310. Slice validation data 310 includes a bit array for each sliced base secret. The bit array may have a length equal to the number of slices made associated with the sliced base secret. The bit values of the bit array may correspond to the validity of remote keys generated for an associated slice. Access to the local memory is only granted when the slice indicated by the remote key is valid based on the slice validation data.

In one embodiment, slice validation data 310 comprises validation bit arrays 312-314 associated with each sliced base secret j, . . . , k. Validation bit arrays 312-314 may begin with all fields of the array indicating that all slices are valid. Valid slices are then assigned to remote keys. When a slice and the corresponding remote keys are invalidated, the bit in validation bit arrays 312-314 that corresponds to the slice index of the sliced base secret is flipped to indicate that the slice is invalid. In one embodiment, slice validation data 310 associated with a given slice index and a given sliced base secret cannot be changed from invalid to valid without changing the associated sliced base secret.

In one embodiment, a single validation bit array may be kept to keep track of the slice validity for all sliced base secrets. For example, when there are $2^m$ sliced base secrets and each sliced base secret is sliced into $2^n$ slices, the slice index may be m+n bits long, where the m bits identify the sliced base secret index and the n bits identifies the slice. In this manner, a single validation bit array VALIDATION_DATA[$2^{(m+n)}$] may be kept to represent all slices of all sliced base secrets.

In one embodiment, all registers 300 of coprocessors of a node contain the same slice validation data 310. Software instructions executing on one or more local primary processors may cause the one or more local primary processors to determine that a selected slice of a selected base secret is expired and change slice validation data 310 in local registers 300. Changing the slice validation data 310 invalidates remote keys generated based on the selected slice before the slice validation data 310 is changed in register 300. In one embodiment, the software instructions are part of a software hypervisor.

Physical Domains

The remote-key based memory buffer access control mechanism may be implemented in a distributed shared memory system with multiple physical domains. Nodes may operate in separate physical domains with distinct address spaces that only a local processor and coprocessor have permission to access.

Figure 4:
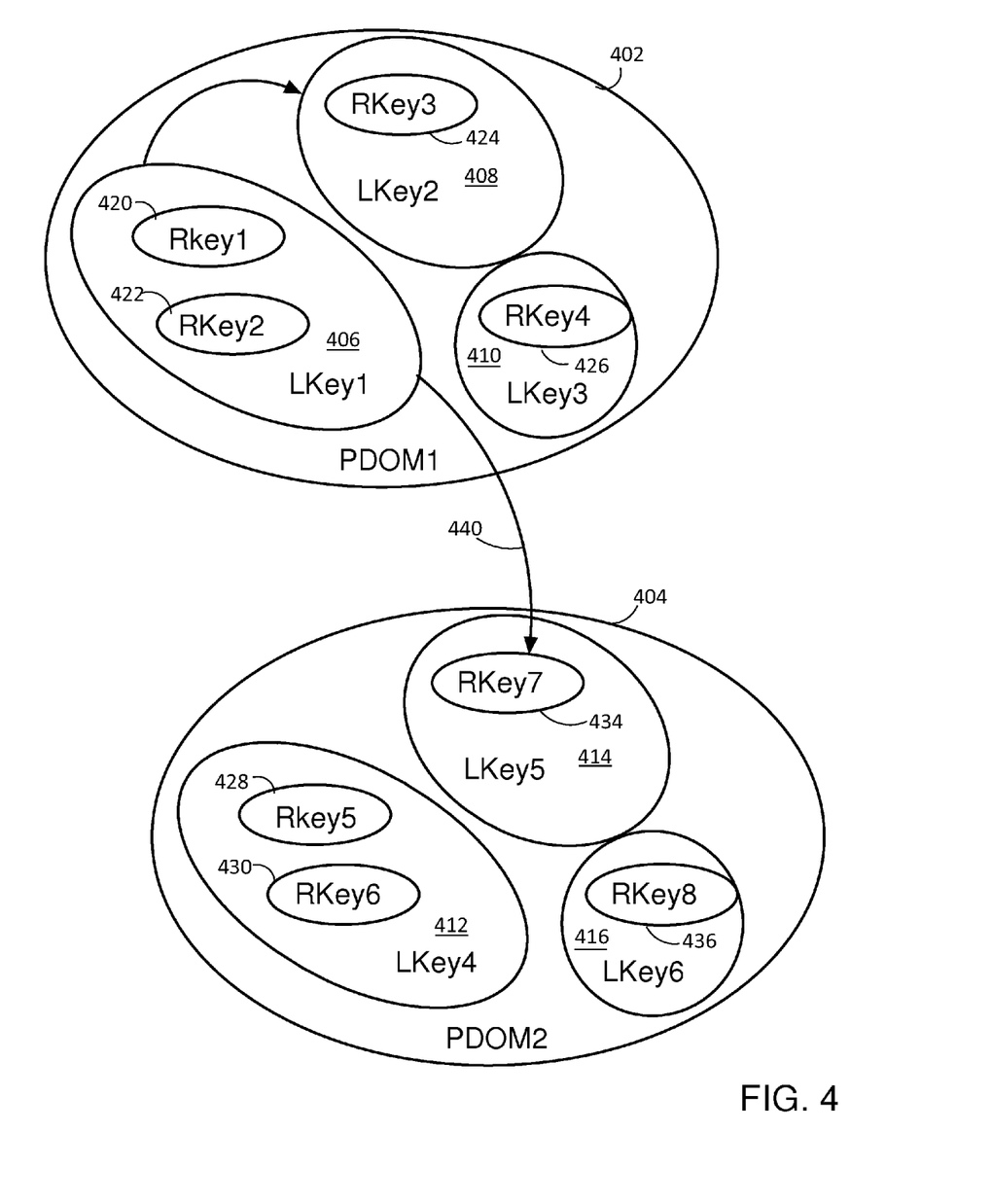
FIG. 4 illustrates a model for the address spaces between nodes in accordance with the remote-key based memory buffer access control mechanism described herein.

For example, FIG. 4 illustrates a model for the address spaces between nodes in accordance with the remote-key based memory buffer access control mechanism described herein. At least one physical domain 402-404 is included. In one embodiment, each physical domain corresponds to a node with one or more processing sockets. Each physical domain 402-404 includes multiple local keys 404-416, which are keys that provide access rights to a unique physical address space local to the physical domain. Local keys are associated with large physically contiguous portions of the physical address space of a physical domain and are allocated for user processes that are local to the physical domain. In FIG. 4, PDOM1 402 has local keys LKey1 406, LKey2 408, LKey3 410. PDOM2 404 has local keys LKey4 412, LKey4 414, LKey6 416.

A remote key is associated with a window of a memory region that has an LKey. Each LKey can include one or more remote keys and associated memory regions. The remote key grants remote access rights from one given local key in a physical domain to another local key in a remote physical domain. The remote user of a portion of memory protected by a remote key presents the remote key to access that portion of memory.

Each node may include at least one coprocessor. The coprocessor, upon receiving the remote key, validates the key and if the validation succeeds, proceeds with the command. FIG. 4 depicts LKey1 406 in PDOM1 as including RKey1 420 and RKey2 422. LKey2 408 includes RKey3 424 and LKey3 410 includes RKey4 426. In PDOM2 404, LKey4 412 includes RKey4 428 and RKey6 430, while LKey4 414 includes RKey4 434 and LKey6 416 includes RKey8 436. FIG. 4 additionally depicts a request 440 by Lkey1 406 in PDOM1 402 for access of the memory associated with RKey4 434 in LKey4 414 in PDOM2 404.

Remote Key Validation

A remote key is issued by the owner of the memory location it covers. A remote client is authorized to access the associated memory location associated with the remote key until the remote key is revoked. When the remote key is used to access the memory location, the owner of the memory location validates the remote key before allowing access.

Figure 5:
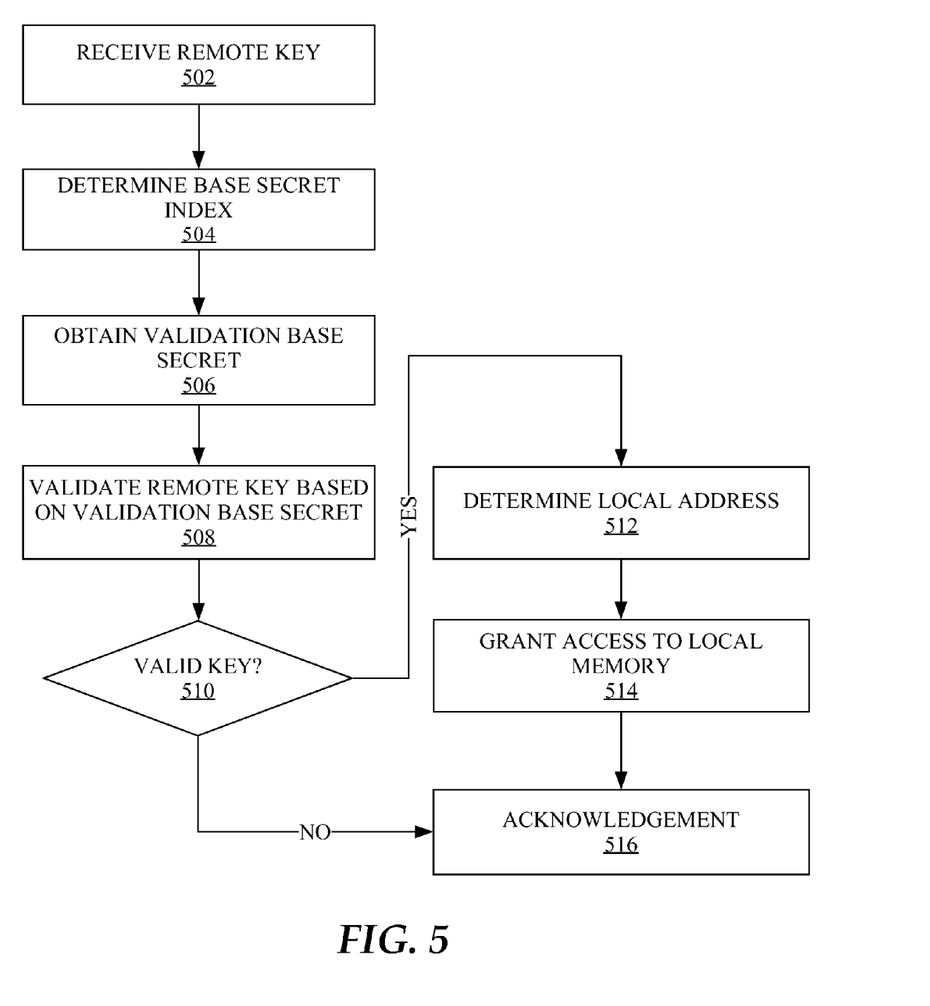
FIG. 5 is a flow diagram that illustrates an embodiment of a method to validate a remote key in accordance with remote-key based memory buffer access control mechanism described herein.

FIG. 5 is a flow diagram that illustrates an embodiment of a method to validate a remote key in accordance with remote-key based memory buffer access control mechanism described herein. While FIG. 5 illustrates exemplary steps according to an embodiment, other embodiments may omit, add to, reorder, and/or modify any of the steps shown. One or more steps of FIG. 5 may be performed by a selected coprocessor of a local node comprising local memory associated with a remote key.

In step 502, a remote key is received. The remote key may be received from a remote node requesting access to local memory. In one embodiment, the remote key is received in a command block comprising the remote key and command information. The remote key includes validation data. The validation data may be generated based on a based secret selected form a set of base secrets, which may be indexed. The remote key further includes a base secret index identifying a base secret location that contains (or previously contained) the base secret used to generate the validation data. In step 504, the base secret index contained in the remote key is determined.

In step 506, the base secret index is used to obtain a validation base secret that will be used to validate the remote key. In one embodiment, the set of base secrets is stored in the register of the selected coprocessor, and the base secret index identifies the validation base secret in the set of base secrets.

In step 508, the validation base secret is used to validate the validation data contained in the remote key. In one embodiment, the selected coprocessor performs hardware validation of the base secret. The remote key may include a hash field containing a hash signature generated using one of a set of configurable base secrets stored in hardware, and validating the remote key involves verifying a hash signature using the validation base secret stored at the base secret index specified in the remote key. In one embodiment, the hash signature is decrypted using the validation base secret, and the output is compared to other data contained in the remote key. The validation fails if the base secret associated with the base secret index in the remote key has been changed in hardware. In decision step 510, if it is determined that the remote key is valid, processing continues to step 512. Otherwise, if the remote key is invalid, processing continues to step 516.

In step 512, a local address is determined. The local address may be determined by translating the remote key to obtain the local physical address. Processing continues to step 514, where access to the local memory is granted. In one embodiment, granting access involves executing a command received with the remote key. The command may be a data storage or maintenance command received from the remote node, and may involve data also received along with the remote key. The selected coprocessor may execute the command in hardware e.g. without using any software instructions or programming API assists to execute the command. In one embodiment, the command is cached before the local address is determined and/or the command is executed. For example, the remote key may include a cache indicator indicating that the command from the remote node should be cached.

In step 516, an acknowledgement is transmitted. The acknowledgement may be transmitted after successful execution of one or more commands received from the remote node. The acknowledgement may also include one or more error notifications indicating that the command was not successfully executed. For example, an error notification may be sent if it is determined that the key is invalid in decision step 510.

Figure 6:
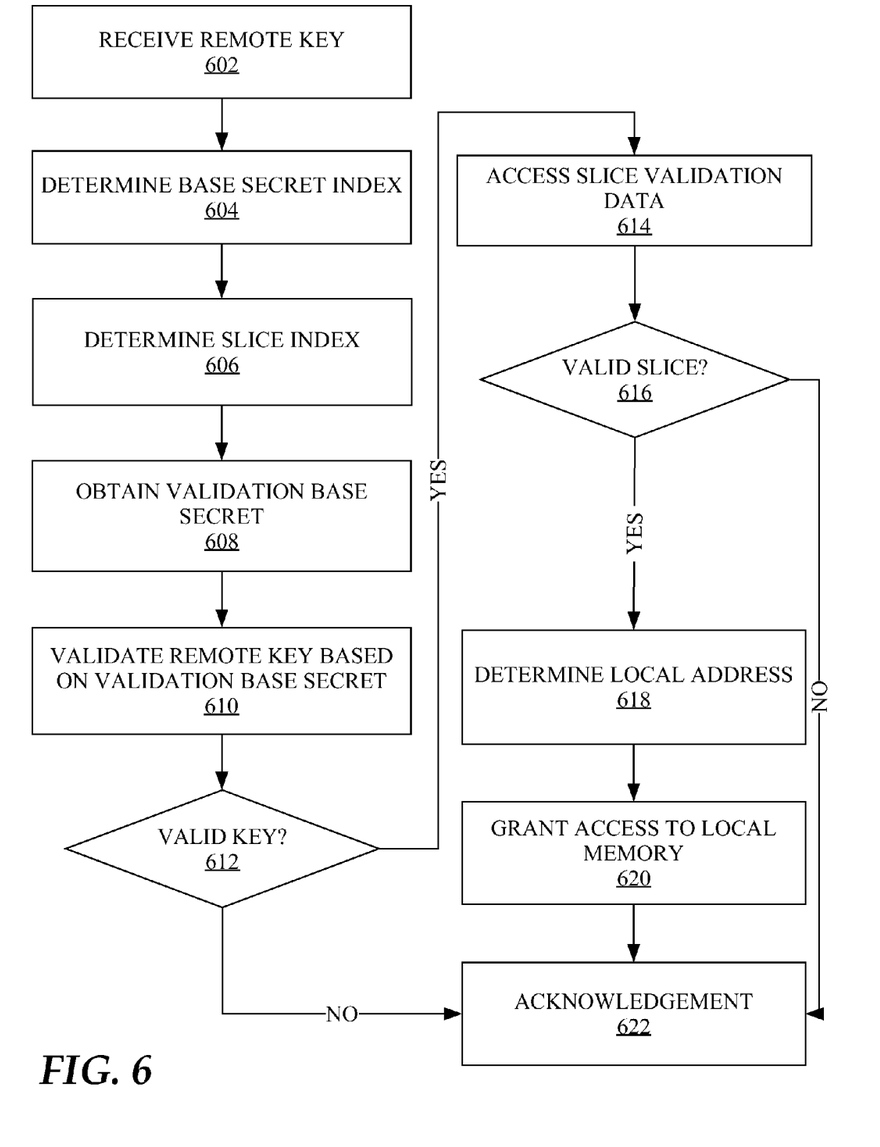
FIG. 6 is a flow diagram that illustrates an embodiment of a method to validate a remote key based using a sliceable base secret in accordance with remote-key based memory buffer access control mechanism described herein.

FIG. 6 is a flow diagram that illustrates an embodiment of a method to validate a remote key based using a sliced base secret in accordance with remote-key based memory buffer access control mechanism described herein. While FIG. 6 illustrates exemplary steps according to an embodiment, other embodiments may omit, add to, reorder, and/or modify any of the steps shown. One or more steps of FIG. 6 may be performed by a selected coprocessor of a local node comprising local memory associated with a remote key.

In one or more embodiments, the set of base secrets includes at least one sliced base secret. Each of the sliced base secrets may be associated with a set of slices. A slice may be individually used to invalidate remote keys associated with the slice without invalidating all remote keys associated with the sliceable remote key. Both sliced base secrets and unsliced base secrets may be used in the same implementation.

In step 602, a remote key is received. The remote key may be received from a remote node requesting access to local memory. In one embodiment, the remote key is received in a command block comprising the remote key and command information. The remote key includes validation data. The validation data may be generated based on a based secret selected form a set of base secrets, which may be indexed. The remote key further includes a base secret index identifying a base secret location that contains (or previously contained) the base secret used to generate the validation data. In step 604, the base secret index contained in the remote key is determined. In step 606, the slice index contained in the remote key is determined.

In step 608, the base secret index is used to obtain a validation base secret that will be used to validate the remote key. In one embodiment, the set of base secrets is stored in the register of the selected coprocessor, and the base secret index identifies the validation base secret in the set of base secrets.

In step 610, the validation base secret is used to validate the validation data contained in the remote key. In one embodiment, the selected coprocessor performs hardware validation of the base secret. The remote key may include a hash field containing a hash signature generated using one of a set of configurable base secrets stored in hardware. Validating the remote key may involve verifying a hash signature using the validation base secret stored at the base secret index specified in the remote key. In one embodiment, the hash signature is decrypted using a the validation base secret, and the output is compared to other data contained in the remote key. In one embodiment, the hash signature includes encoded information containing the slice index. The validation fails if the base secret associated with the base secret index in the remote key has been changed in hardware. In decision step 612, if it is determined that the remote key is valid, processing continues to step 614. Otherwise, if the remote key is invalid, processing continues to step 622.

In step 614, slice validation data is accessed to determine if the slice indicated in the remote key is valid. The slice validation data may be stored in hardware, such as in a registry associated with the selected coprocessor. The selected coprocessor may determine if the slice is valid in hardware, e.g. without using any software instructions or programming API assists to perform the validation. In one embodiment, the slice validation data includes a bit array for each sliced base secret. The bit array may have a length equal to the number of slices made available for the associated base secret. The bit values of the bit array may correspond to the validity of remote keys generated for an associated slice. Access to the local memory is only granted when the slice indicated by the remote key is valid based on the slice validation data. In decision step 616, if it is determined that the slice is valid, processing continues to step 618. Otherwise, if the slice is invalid, processing continues to step 622.

In step 618, a local address is determined. The local address may be determined by translating the remote key to obtain the local physical address. Processing continues to step 620, where access to the local memory is granted. In one embodiment, granting access involves executing a command received with the remote key. The command may be a data storage or maintenance command received from the remote node, and may involve data also received along with the remote key. The selected coprocessor may execute the command in hardware e.g. without using any software instructions or programming API assists to execute the command. In one embodiment, the command is cached before the local address is determined and/or the command is executed. For example, the remote key may include a cache indicator indicating that the command from the remote node should be cached.

In step 622, an acknowledgement is transmitted. The acknowledgement may be transmitted after successful execution of one or more commands received from the remote node. The acknowledgement may also include one or more error notifications indicating that the command was not successfully executed. For example, an error notification may be sent if it is determined that the key or the slice is invalid in decision steps 612 or 616.

Coprocessor Command Execution

A coprocessor may execute commands received from the hypervisor. In one embodiment, the coprocessor executes the command asynchronously with the thread in the multi-threaded hypervisor that issued the command. If the hypervisor sends multiple commands, the coprocessor may cache the command. The coprocessor can execute some commands in parallel.

A coprocessor may be designed to support a variety of data movement and maintenance commands without support from a primary processor. In one embodiment, the coprocessor supports data movement commands and data maintenance commands. The data movement commands may be selected from: Copy, CopyImmediate, CopyAndSignal, CopyAndSignalImmediate, Fill, Store, CAS and CASAndFetch, CAM/AtomicAdd/AtomicOr, and AtomicMessagePush. The data maintenance commands may be selected from: Interrupt, Sync and NoOP.

In one embodiment, the command may involve a source address and/or a destination address. The source address ("SourceAddress") or the destination address ("DestAddress") is located in a remote physical domain, then a remote key ("RKey") is specified instead of a physical address.

Figure 7:
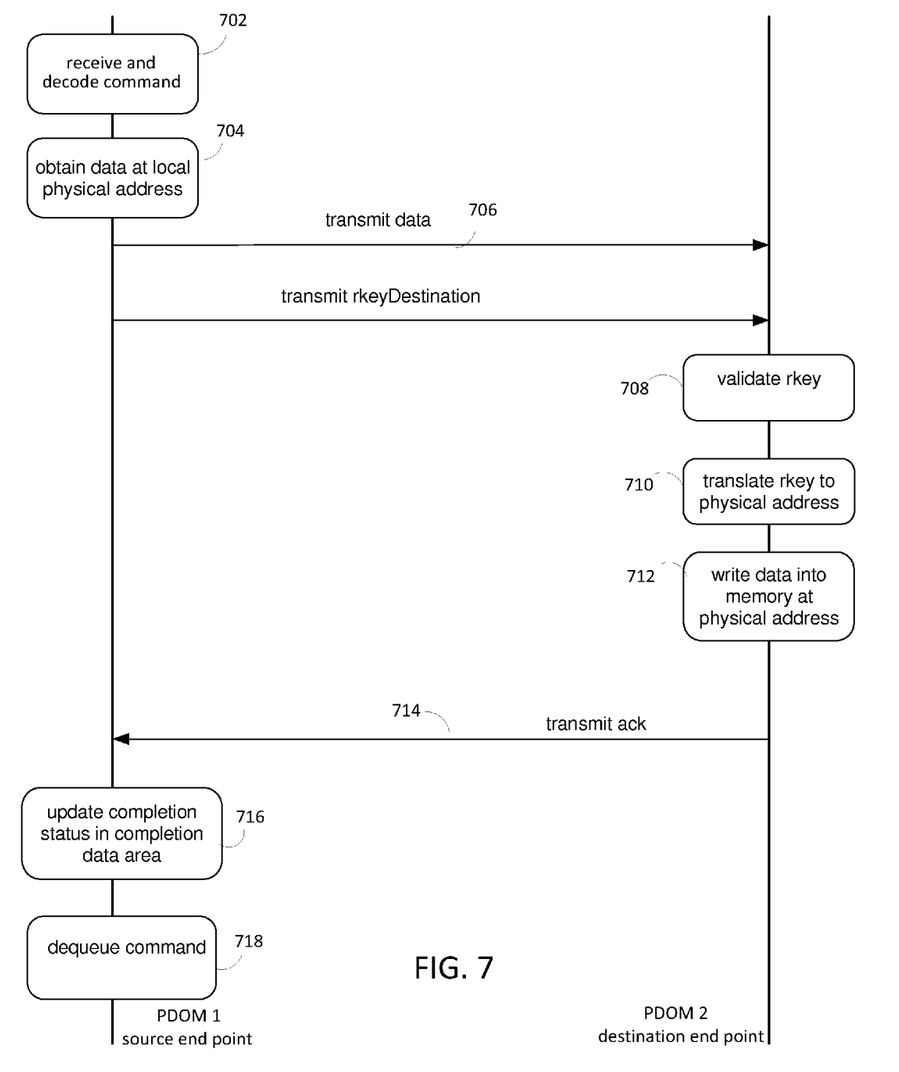
FIG. 7 illustrates a command operation between nodes in accordance with the remote-key based memory buffer access control mechanism described herein.

FIG. 7 illustrates a command operation between nodes in accordance with the remote-key based memory buffer access control mechanism described herein. While FIG. 7 illustrates exemplary steps according to an embodiment, other embodiments may omit, add to, reorder, and/or modify any of the steps shown.

In step 702, a source coprocessor in a first physical domain PDOM1 receives and decodes a new command to access remote memory in a second physical domain PDOM 2. In one embodiment, the source coprocessor receives the command from a hypervisor associated with PDOM1. In step 704, the source coprocessor obtains local data associated with the command at a local physical address. In step 706, the source coprocessor transmits the command and the data associated with the command to the second physical domain PDOM2 along with a remote key.

The destination coprocessor in PDOM2 receives the command and the data associated with the command. In one embodiment, the destination coprocessor receives the command from a hypervisor associated with PDOM2. In step 708, the destination coprocessor performs hardware validation on the remote key. For example, the destination coprocessor may execute one or more steps of the methods described in FIGS. 5-6 to validate the remote key. In step 710, after successful validation of the remote key, the destination coprocessor translates the remote key to obtain a local physical address. In step 712, the destination coprocessor executes the command. As shown in FIG. 7, the command involves writing the transmitted data to the local physical address associated with the remote key.

In step 714, the destination coprocessor in PDOM2 transmits an acknowledgment back to the source coprocessor in PDOM1 indicating the completion of the command. In one embodiment, the acknowledgement may be an error notification indicating that the command was not successfully executed. For example, the error notification may indicate that validation was not successful. In step 716, the source coprocessor, upon receipt of the acknowledgment, updates the completion status in the command block. In step 718, the source coprocessor dequeues the command.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
   a local node comprising a local memory and at least one coprocessor coupled with the local memory, each coprocessor comprising a register;
   a plurality of base secrets, wherein each of the plurality of base secrets is associated with a base secret index, wherein each register is configured to store the plurality of base secrets based on the base secret index;
   at least one primary processor configured to execute software instructions that cause the at least one primary processor to change a selected base secret in the registers based on a selected base secret index associated with the selected base secret;
   wherein a selected coprocessor selected from the at least one coprocessor is configured to:
   receive a first remote key comprising a first base secret index and first validation data generated based on a first base secret, wherein the first remote key is received from a first node requesting access to the local memory;
   obtain a validation base secret stored in the register of the selected coprocessor based on the first base secret index;
   perform hardware validation on the first validation data based on the validation base secret, wherein hardware validation fails when the base secret associated with the first base secret index has been changed in the register of the selected coprocessor;
   grant the first node access to the local memory after successful hardware validation on the first validation data.

2. The system of claim 1, wherein the first validation data comprises a hash field generated based on the first base secret.

3. The system of claim 1, wherein the selected coprocessor is further configured to:
   generate a second remote key comprising a second base secret index and second validation data generated based on a second base secret stored in the register of the selected coprocessor based on the second base secret index;
   transmit the second remote key to a second node to grant the second node access to the local memory,
   wherein the second node is authorized to access a portion of the local memory associated with the second remote key as long as the second base secret remains unchanged.

4. The system of claim 1, wherein the selected coprocessor is further configured to:
   request access to a remote memory associated with a third node;

receive a third remote key from the third node;
transmit the third remote key to the third node to access the remote memory associated with the third remote node.

5. The system of claim 1, wherein the first remote key is received from a software hypervisor of the first node.

6. The system of claim 1, wherein at least one of the plurality of base secrets is a sliced base secret, wherein each sliced base secret is associated with a set of slices, each slice corresponding a local physical address of the local memory.

7. The system of claim 6:
wherein the register of the selected coprocessor is further configured to store slice validation data;
wherein the first base secret is a sliced based secret;
wherein the first remote key further comprises a first slice index identifying a slice associated with the first base secret;
wherein the hardware validation of the first remote key is further based on the first slice index and the slice validation data;
wherein the software instructions further cause the at least one primary processor to modify slice validation data corresponding to a selected slice of a selected sliced base secret to indicate that remote keys associated with the selected slice of a selected sliced base secret are invalid.

8. The system of claim 7, wherein the slice validation data comprises a bit array associated with each sliced base secret, wherein each bit value of each bit array corresponds to the validity of remote keys generated for an associated slice.

9. The system of claim 7, wherein slice validation data associated with a given slice index and a given sliced base secret cannot be changed from invalid to valid without changing the given sliced base secret.

10. The system of claim 7:
wherein each register of the at least one coprocessor stores the same slice validation data;
wherein the software instructions further cause the at least one primary processor to update the slice validation data stored on the registers after modifying the slice validation data.

11. The system of claim 1:
wherein the first remote key further comprises a cache indicator indicating that a command from the first node should be cached;
wherein the selected coprocessor is further configured to selectively cache the command and associated data from the first node based on the cache indicator.

12. The system of claim 11, wherein selectively caching the command is further based on a local decision to override the cache indicator in the first remote key.

13. The system of claim 1, wherein the first remote key is received in a command block comprising an address field containing the first remote key, and wherein granting the first node access to the local memory comprises executing a command contained in the command block, wherein the command is selected from the group consisting of a copy command, a copy and signal command, a fill command, a store command, a compare and swap command, an atomic add command, an atomic OR command, and an interrupt and sync command.

14. A system comprising:
a first node comprising a first local memory and a first plurality of coprocessors coupled with the first local memory, each of the first plurality of coprocessors comprising a register;
a first plurality of base secrets associated with the first node, wherein each of the first plurality of base secrets is indexed by a first plurality of base secret indexes, wherein each register of the first plurality of coprocessors is configured to store the first plurality of base secrets based on the first plurality of base secret indexes;
a second node comprising a second local memory and a second plurality of coprocessors coupled with the second local memory, each of the second plurality of coprocessors comprising a register;
wherein the first node further comprises at least one primary processor configured to execute software instructions that cause the at least one primary processor to change an expired base secret in the registers of the first plurality of coprocessors based on a selected base secret index associated with the expired base secret;
wherein a selected first node coprocessor selected from the first plurality of coprocessors is configured to:
generate a first remote key comprising a first base secret index and validation data, wherein the validation data is generated based on a first base secret stored in the register of the selected coprocessor based on the first base secret index;
transmit the first remote key to the second node to grant the second node access to the first local memory, wherein the second node is authorized to access a portion of the first local memory associated with the first remote key as long as the first base secret remains unchanged;
receive the first remote key and a command requiring access to the first local memory from the second node;
obtain a validation base secret stored in the register of the selected first node coprocessor based on the first base secret index;
perform hardware validation of the first remote key based on the validation base secret, wherein hardware validation fails when the base secret associated with the first base secret index has been changed in the register of the selected first node coprocessor;
wherein the selected first node coprocessor is configured to execute the command from the second node after successful hardware validation of the first remote key.

15. The system of claim 14, wherein the validation data comprises a hash field generated based on the first base secret.

16. The system of claim 14:
wherein at least one of the first plurality of base secrets is a sliced base secret;
wherein each sliced base secret is associated with a set of slices, each slice corresponding a local physical address of the local memory;
wherein the register of the selected first node coprocessor is further configured to store slice validation data;
wherein the first base secret is a sliced based secret;
wherein the first remote key further comprises a first slice index identifying a slice associated with the first base secret;
wherein the hardware validation of the first remote key is further based on the first slice index and the slice validation data;
wherein the software instructions further cause the at least one primary processor to modify slice validation data corresponding to a selected slice of a selected sliced base secret to indicate that remote keys associated with the selected sliced of the selected base secret are invalid.

17. The system of claim 16, wherein the slice validation data comprises a bit array associated with each sliced base secret, wherein each bit value of each bit array corresponds to the validity of remote keys generated for an associated slice.

18. The system of claim 16, wherein slice validation data corresponding to a given slice index and a given sliced base secret cannot be changed from invalid to valid without changing the given sliced base secret.

19. The system of claim 14:
wherein the first remote key further comprises a cache indicator indicating that the command from the second node should be cached;
wherein the selected first node coprocessor is further configured to selectively cache the command and associated data from the second node based on the cache indicator.

20. A method comprising:
storing, in each register of at least one coprocessor of a local node, a plurality of base secrets, wherein each of the plurality of base secrets is associated with a base secret index, wherein each register is configured to store the plurality of base secrets based on the base secret index;
wherein the local node comprises at least one primary processor, a local memory and the at least one coprocessor, wherein each coprocessor of the at least one coprocessor is coupled with the local memory and comprises a register;
performing, by a selected coprocessor selected from the at least one coprocessor:
receiving a first remote key comprising a first base secret index and first validation data generated based on a first base secret, wherein the first remote key is received from a first node requesting access to the local memory;
obtaining a validation base secret stored in the register of the selected coprocessor based on the first base secret index;
performing hardware validation on the first validation data based on the validation base secret, wherein hardware validation fails when the base secret associated with the first base secret index has been changed in the register of the selected coprocessor;
granting the first node access to the local memory after successful hardware validation on the first validation data,
wherein the at least one primary processor is configured to execute software instructions that cause the at least one primary processor to perform changing a selected base secret in a register of the selected coprocessor based on a selected base secret index associated with the selected base secret;
wherein the method is performed by one or more computing devices.

21. The method of claim 20, wherein the first validation data comprises a hash field generated based on the first base secret.

22. The method claim 20, further comprising the selected coprocessor performing:
generating a second remote key comprising a second base secret index and second validation data generated based on a second base secret stored in the register of the selected coprocessor based on the second base secret index;
transmitting the second remote key to a second node to grant the second node access to the local memory,
wherein the second node is authorized to access a portion of the local memory associated with the second remote key as long as the second base secret remains unchanged.

23. The method of claim 20, further comprising the selected coprocessor performing:
requesting access to a remote memory associated with a third node;
receiving a third remote key from the third node;
transmitting the third remote key to the third node to access the remote memory associated with the third remote node.

24. The method of claim 20, wherein the first remote key is received from a software hypervisor of the first node.

25. The method of claim 20, wherein at least one of the plurality of base secrets is a sliced base secret, wherein each sliced base secret is associated with a set of slices, each slice corresponding a local physical address of the local memory.

26. The method of claim 25:
wherein the register of the selected coprocessor is further configured to store slice validation data;
wherein the first base secret is a sliced based secret;
wherein the first remote key further comprises a first slice index identifying a slice associated with the first base secret;
wherein the hardware validation of the first remote key is further based on the first slice index and the slice validation data;
wherein the software instructions further cause the at least one primary processor to modify slice validation data corresponding to a selected slice of a selected sliced base secret to indicate that remote keys associated with the selected slice of a selected sliced base secret are invalid.

27. The method of claim 26, wherein the slice validation data comprises a bit array associated with each sliced base secret, wherein each bit value of each bit array corresponds to the validity of remote keys generated for an associated slice.

28. The method of claim 26, wherein slice validation data associated with a given slice index and a given sliced base secret cannot be changed from invalid to valid without changing the given sliced base secret.

29. The method of claim 26:
wherein each register of the at least one coprocessor stores the same slice validation data;
wherein the software instructions further cause the at least one primary processor to update the slice validation data stored on the registers after modifying the slice validation data.

30. The method of claim 20:
wherein the first remote key further comprises a cache indicator indicating that a command from the first node should be cached;
wherein the selected coprocessor is further configured to selectively cache the command and associated data from the first node based on the cache indicator.

31. The method of claim 30, wherein selectively caching the command is further based on a local decision to override the cache indicator in the first remote key.

32. The method of claim 20, wherein the first remote key is received in a command block comprising an address field containing the first remote key, and wherein granting the first node access to the local memory comprises executing a command contained in the command block, wherein the command is selected from the group consisting of a copy command, a copy and signal command, a fill command, a store command, a compare and swap command, an atomic add command, an atomic OR command, and an interrupt and sync command.

* * * * *